US008027677B2

(12) United States Patent
Carpenter

(10) Patent No.: US 8,027,677 B2
(45) Date of Patent: Sep. 27, 2011

(54) AUTOMATIC NETWORK SELECTION METHODS AND APPARATUS USING A STEERED PLMN

(75) Inventor: Paul Marcus Carpenter, St. Margarets (GB)

(73) Assignee: Research In Motion Limited, Waterloo, Ontario (CA)

( * ) Notice: Subject to any disclaimer, the term of this patent is extended or adjusted under 35 U.S.C. 154(b) by 1338 days.

(21) Appl. No.: 11/352,809

(22) Filed: Feb. 13, 2006

(65) Prior Publication Data

US 2007/0191006 A1 Aug. 16, 2007

(51) Int. Cl.
*H04W 4/00* (2009.01)
(52) U.S. Cl. .............. 455/435.2; 455/432.1; 455/435.1; 370/338
(58) Field of Classification Search ............... 455/435.2, 455/432.1, 435.1
See application file for complete search history.

(56) References Cited

U.S. PATENT DOCUMENTS

| | | | |
|---|---|---|---|
| 5,999,811 | A | 12/1999 | Moelne et al. |
| 6,119,003 | A | 9/2000 | Kukkohovi |
| 6,567,663 | B1 | 5/2003 | Otting et al. |
| 7,072,651 | B2 * | 7/2006 | Jiang et al. ................. 455/432.1 |
| 7,096,015 | B2 | 8/2006 | Bridges et al. |
| 7,184,768 | B2 | 2/2007 | Hind et al. |
| 2002/0119774 | A1 | 8/2002 | Johannesson et al. |
| 2002/0147012 | A1* | 10/2002 | Leung et al. .................. 455/433 |
| 2003/0119481 | A1* | 6/2003 | Haverinen et al. ............ 455/411 |
| 2005/0059397 | A1 | 3/2005 | Zhao |
| 2005/0147060 | A1 | 7/2005 | Buckley |

FOREIGN PATENT DOCUMENTS

| | | |
|---|---|---|
| EP | 1463366 A2 | 3/2004 |
| EP | 1 463 366 A2 | 9/2004 |
| EP | 1463366 A2 | 9/2004 |
| WO | 9949690 A1 | 9/1999 |

(Continued)

OTHER PUBLICATIONS

Korean Office Action—Application No.—10-2007-0014829—Sep. 26, 2008.

(Continued)

*Primary Examiner* — Wayne Cai
*Assistant Examiner* — Chuck Huynh
(74) *Attorney, Agent, or Firm* — Finnegan, Henderson Farabow, Garrett & Dunner LLP

(57) ABSTRACT

Methods and apparatus for automatically selecting a wireless communication network by user equipment using a "steered" PLMN are disclosed. A home network identification, a list of prioritized roaming network identifications, and a steered network identification are stored in memory (e.g. a SIM or USIM) of the user equipment. In an automatic network selection procedure, a scanning operation is performed to receive one or more network identifications corresponding to one or more available wireless communication networks in a coverage area. The user equipment attempts to select a wireless communication network in the coverage area by comparing the received network identifications from the scanning operation with the steered network identification. If a match between a received network identification and the steered network identification is identified, a wireless communication network corresponding to the received network identification that matches the steered network identification is selected and registered with by the user equipment. This procedure is performed in lieu of use of the list of prioritized roaming network identifications of the user equipment. By setting the steered network identification via an over-the-air programming procedure when necessary (e.g. on a per region basis), a home network operator may "steer" user equipment to any desired network immediately and efficiently.

16 Claims, 6 Drawing Sheets

FOREIGN PATENT DOCUMENTS

| WO | 0147316 A2 | 6/2001 |
|---|---|---|
| WO | 2005/032196 A1 | 4/2005 |
| WO | 2005/048632 A1 | 5/2005 |
| WO | 2005104512 A1 | 11/2005 |

OTHER PUBLICATIONS

3rd Generation Partnership Project; 3 GPP "Technical Specification Group Core Network and Terminals": Sep. 2005, 34 pgs, retrevied from http://www.3gpp.org.

European Search Report for Application # 06250765.2, Jun. 6, 2006.

European Search Report Application # 06250765.2, Dated Jun. 6, 2006.

Office Action for Japanese patent application #2007-031372, Feb. 9, 2007.

Extended European Search Report and Search Opinion dated Nov. 8, 2010 in corresponding EP patent application No. 10176923.0 (5 pages).

Examination Report dated Feb. 16, 2011 in corresponding EP patent application No. 06 250785.2 (4 pages).

Office Action for corresponding Taiwanese Patent Application No. 096105040 dated Feb. 11, 2011 (11 pages including translation).

Office Action issued in corresponding Canadian Patent Application No. 2,577,689 dated Jun. 3, 2010 (6 pages).

Office Action for corresponding Canadian Patent Application No. 2,577,689 dated Jul. 12, 2011 (4 pages).

Office Action for corresponding Chinese Patent Application No. 200710008095.1 dated Jun. 21, 2011 (3 pages), including English translation (4 pages).

* cited by examiner

AUTOMATIC NETWORK SELECTION METHODS AND APPARATUS USING A STEERED PLMN

BACKGROUND

1. Field of the Technology

The present invention relates generally to automatic network selection techniques for mobile stations operating in wireless communication networks.

2. Description of the Related Art

For a variety of reasons, a home network operator (e.g. a home public land mobile network or HPLMN in 3GPP parlance) may have a need to dynamically control which networks their subscribers connect to when roaming either in the home country or abroad. For example, the HPLMN operator may have a need to direct its subscribers roaming in country A to be served by network X. This need may arise for commercial reasons, and at certain times it may be beneficial for an operator to ensure that all of their roaming subscribers be directed to one specific network, to ensure that some contractual criteria is met. Another reason is due to network fault conditions. A temporary fault may mean that one network in a given country is unable to offer all of its services to a HPLMN's roaming subscribers. Therefore, the HPLMN operator may have a need to direct its roaming subscribers towards other networks in the country which can offer a full range of service. By way of example, it is not uncommon today for General Packet Radio Service (GPRS) to be temporarily unavailable in a certain Visited PLMN (VPLMN). Yet another reason is based on network load sharing. For example, the HPLMN operator may decide that it wants 40% of its roaming subscribers in a country on network X, 35% on network Y, and 25% on network Z.

The current 3GPP standard specifies that user equipment (UE) shall select the highest priority network as defined in a Preferred PLMN (PPLMN) list stored in a Subscriber Identity Module (SIM) or Universal Subscriber Identity Module (USIM). If dynamic control were to be achieved through use of the PPLMN list, the HPLMN operator would have to update the entire PPLMN list for each subscriber using an over-the-air (OTA) programming mechanism, which requires a large number of Short Message Service (SMS) messages. The large overhead required to update all of the PPLMN lists for the roaming subscribers may be prohibitive. Further, if network load sharing is needed, the HPLMN would have to maintain PPLMN lists on a per subscriber basis. Maintaining such PPLMN lists, however, adds significant overhead with respect to configuration management.

Existing solutions which direct subscribers to a particular network while roaming involve the spoofing of network reject messages by the HPLMN operator when the user equipment makes connection attempts to VPLMNs as per the PPLMN list. The network reject messages are sent via each selected VPLMN until the desired VPLMN, as identified by the HPLMN operator, is reached. Although this technique directs user equipment to specific VPLMNs desired by the HPLMN operator, as apparent it involves a wasteful use of network resources each time such selection is needed.

Accordingly, what are needed are methods and apparatus which overcome the deficiencies of the prior art.

SUMMARY

Methods and apparatus for automatically selecting a wireless communication network by user equipment using a "steered" PLMN are described. A home network identification, a list of prioritized roaming network identifications, and a steered network identification are stored in memory (e.g. a SIM or USIM) of the user equipment. In an automatic network selection procedure, a scanning operation is performed to receive one or more network identifications corresponding to one or more available wireless communication networks in a coverage area. The user equipment attempts to select a wireless communication network in the coverage area by comparing the received network identifications from the scanning operation with the steered network identification. If a match between a received network identification and the steered network identification is identified, a wireless communication network corresponding to the received network identification that matches the steered network identification is selected and registered with by the user equipment. This procedure is performed in lieu of or prior to use of the list of prioritized roaming network identifications of the user equipment. By setting the steered network identification via an over-the-air programming procedure when necessary (e.g. on a per region basis), a home network operator may "steer" user equipment to any desired network immediately and efficiently.

One illustrative technique for use in steering user equipment to a steered wireless communication network by network equipment of a wireless communication network which is a home communication network of the user equipment includes the acts of identifying that the user equipment is operating in one region of a plurality of roaming regions through a visited wireless communication network of the roaming region; and causing a steered network identification corresponding to a steered wireless communication network of the roaming region to be sent through the visited wireless communication network to the user equipment, so that the steered wireless communication network is selected in an automatic network selection procedure of the user equipment. The steered network identification may be sent in a message, such as a Short Message Service (SMS) message, or an over-the-air programming procedure. Multiple methods of providing the steered network identification to the user equipment are feasible and, in addition to SMS, may include the definition of new signaling messages, the use of USSD (Unstructured Supplementary Service Data) (see 3GPP TS 22.090), and the adaptation of existing signaling systems such as MAP (Mobile Application Part).

In an alternative arrangement the user equipment may be provisioned with information (such as an internet URL or other) that will enable it to retrieve the steered network identification without the home communication network having to send the information. This may be retrieved from a web site, database or other information store provided by the home communications network or in certain circumstances by a third party.

Other additional and alternative advantageous features are described in the detailed description.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for automatically selecting a wireless communication network by user equipment using a "steered" PLMN are described. A home network identification, a list of prioritized roaming network identifications, and a steered network identification are stored in memory (e.g. a SIM or USIM) of the user equipment. In an automatic network selection procedure, a scanning operation is performed to receive one or more network identifications corresponding to one or more available wireless communication networks in a coverage area. The user equipment attempts to select a wireless communication network in the coverage area by comparing the received network identifications from the scanning operation with the steered network identification. If a match between a received network identification and the steered network identification is identified, a wireless communication network corresponding to the received network identification that matches the steered network identification is selected and registered with by the user equipment. This procedure is performed in lieu of or prior to use of the list of prioritized roaming network identifications of the user equipment. By setting the steered network identification via an over-the-air programming procedure when necessary (e.g. on a per region basis), a home network operator may "steer" user equipment to any desired network immediately and efficiently. One illustrative technique for use in steering user equipment to a steered wireless communication network by network equipment of a wireless communication network which is a home communication network of the user equipment includes the acts of identifying that the user equipment is operating in one region of a plurality of roaming regions through a visited wireless communication network of the roaming region; and causing a steered network identification corresponding to a steered wireless communication network of the roaming region to be sent through the visited wireless communication network to the user equipment, so that the steered wireless communication network is selected in an automatic network selection procedure of the user equipment. The steered network identification may be sent in a message, such as a Short Message Service (SMS) message, of an over-the-air programming procedure.

Figure 1:
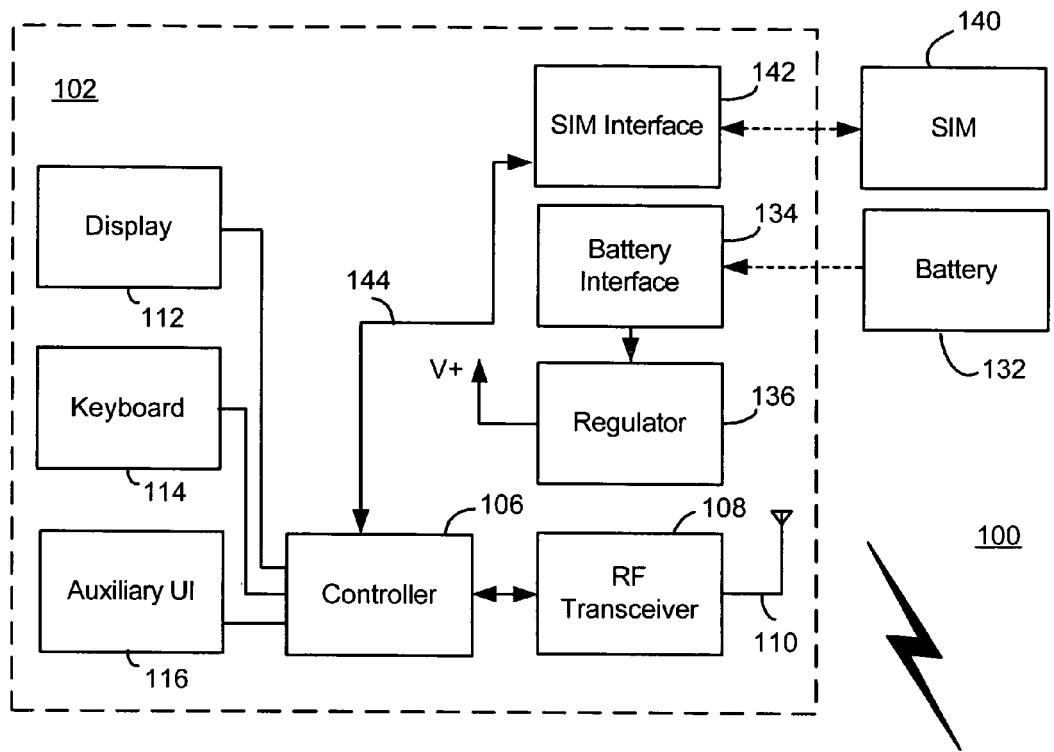
FIG. 1 is a block diagram which illustrates pertinent components of a user equipment and a wireless communication network.
Figure 1:
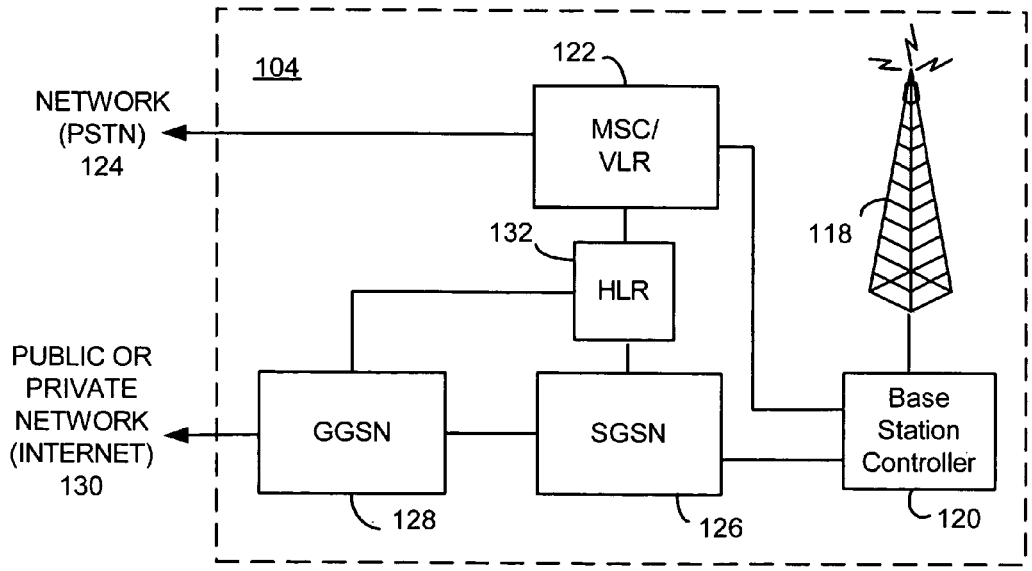

To illustrate general components for communications, FIG. 1 is a block diagram of a communication system 100 which includes a mobile station 102 (one type of user equipment, wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and Base Station Controller BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power V+ to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. Without SIM 140, the mobile device may be referred to as mobile equipment (ME); with SIM 140, the mobile device may be referred to as user equipment (UE). SIM 140 is one type of a removable memory module or "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiplefunction communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN 126, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
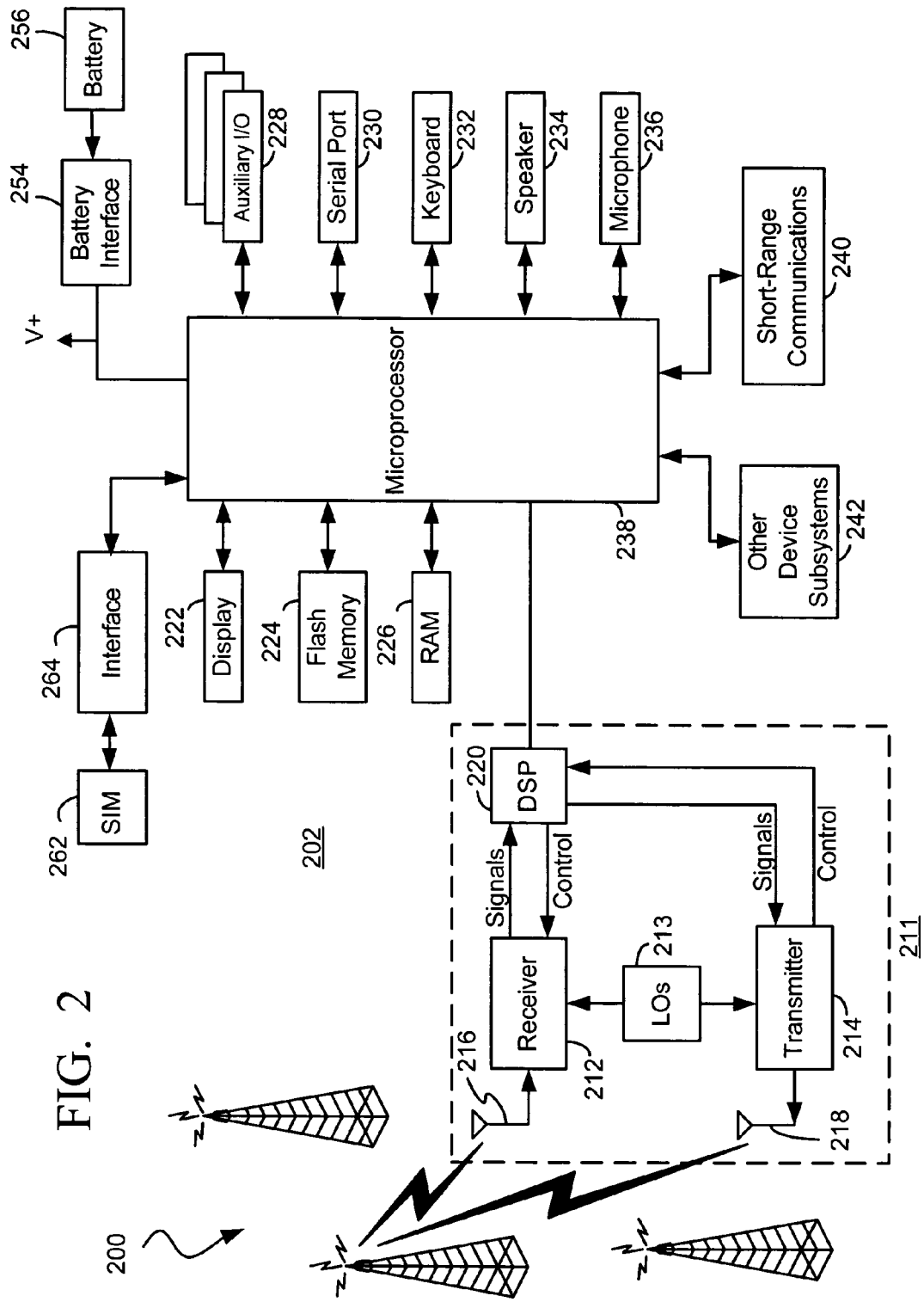
FIG. 2 is a more detailed diagram of the preferred user equipment of FIG. 1.

FIG. 2 is a detailed block diagram of a preferred mobile station 202 of the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Again, without SIM 262, the mobile device may be referred to as mobile equipment (ME); with SIM 262, the mobile device may be referred to as user equipment (UE). Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the network selection techniques of the present application, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
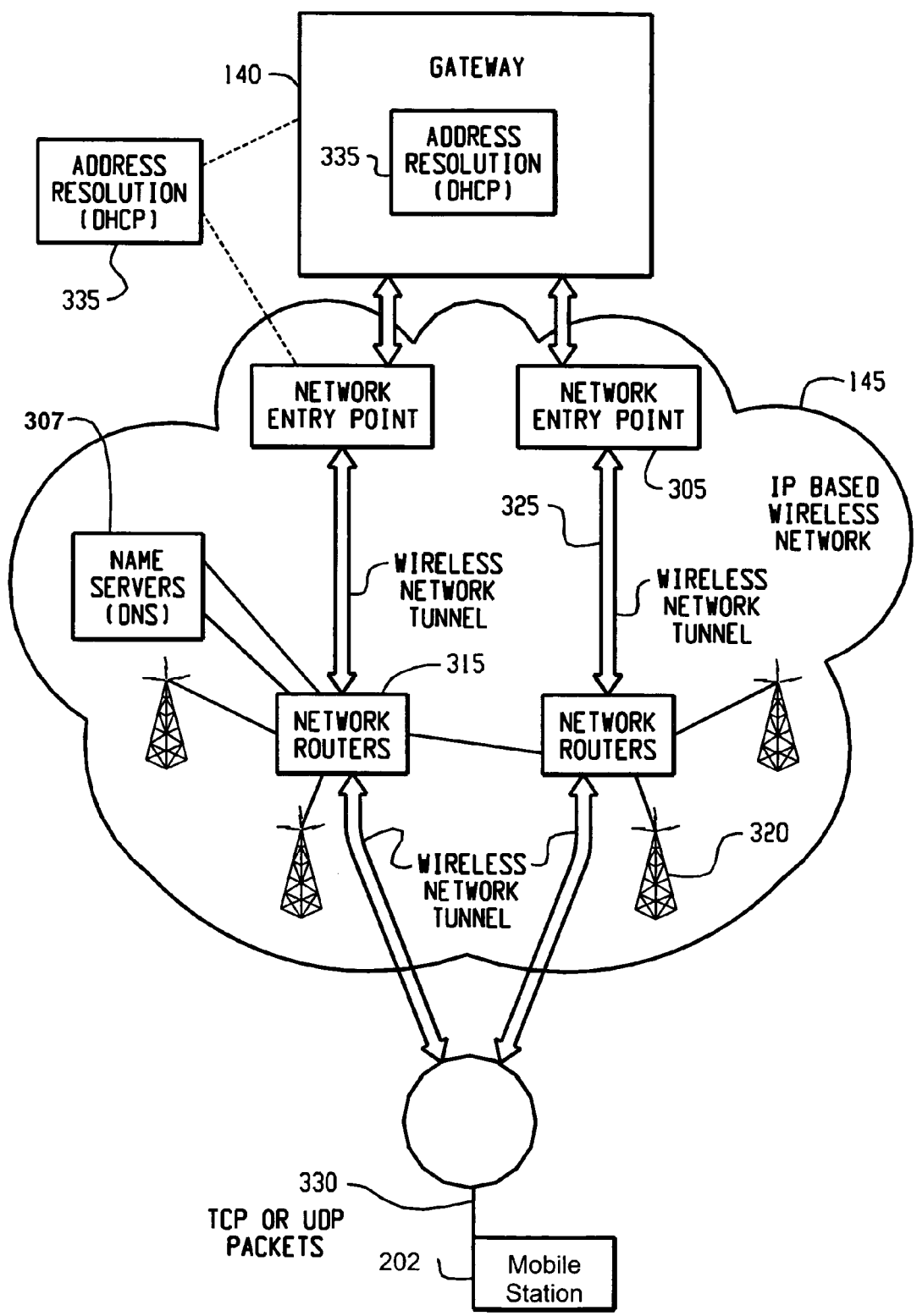
FIG. 3 is a system structure which helps provide data communication services for the user equipment in the wireless network of FIGS. 1 and 2.

FIG. 3 shows a system structure which helps provide data communication services for the mobile station. In particular, FIG. 3 shows basic components of an IP-based wireless data network which may be utilized. Mobile station 202 of FIG. 3 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets 330, such as Transmission Control Protocol (TCP) or User Datagram Protocol (UDP) packets, are transmitted from gateway 140, which is source of information to be transmitted to mobile station 202, through network 145 by setting up a wireless network tunnel 325 from gateway 140 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless packet data network 145 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 202.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 202 must use a specific technique associated with wireless network 145. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 202 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 202. When an IP address has been allocated to mobile station 202 and communicated to gateway 140, information can then be forwarded from gateway 140 to mobile station 202.

A mobile station typically offers a manual network selection for the end user as well as an automatic network selection procedure. The current 3GPP standard specifies that, for roaming, a mobile station shall select the highest priority network available as defined in a Preferred PLMN (PPLMN) list stored in the SIM. For example, see section 4.4.3.1.1 of the 3GPP standard (3GPP TS 23.122 V7.3.0 (2005-09). However, a home network operator (e.g. a home public land mobile network or HPLMN in 3GPP parlance) may still have a need to dynamically control which networks their subscribers connect to when roaming either in the home country or abroad. For example, the HPLMN operator may have a need to direct its subscribers roaming in country A to be served by network X. One reason is commercial in nature. In roaming agreements, one operator may offer another operator a better rate in return for a certain amount of usage by roaming subscribers. Thus, at certain times it may be beneficial for an operator to ensure that all of their roaming subscribers be directed to one specific network to ensure that the usage criteria is met. Another reason is due to network fault conditions. A temporary fault may mean that one network in a given country is unable to offer all of its services to a HPLMN's roaming subscribers. Therefore, the HPLMN operator may have a need to direct its roaming subscribers towards other networks in the country which can offer a full range of service. By way of example, it is not uncommon today for GPRS to be temporarily unavailable in a certain Visited PLMN (VPLMN). Yet another reason is based on network load sharing. For example, the HPLMN operator may decide that it wants 40% of its roaming subscribers in a country on network X, 35% on network Y, and 25% on network Z.

If dynamic control were to be achieved through use of the conventional PPLMN list, the HPLMN operator would have to update the entire PPLMN list for each subscriber using an over-the-air (OTA) programming mechanism, which requires a large number of Short Message Service (SMS) messages. The large overhead required to update all of the PPLMN lists for the roaming subscribers may be prohibitive. Further, if network load sharing is needed, the HPLMN would have to maintain PPLMN lists on a per subscriber basis. Maintaining such PPLMN lists, however, is inconsistent with operating procedures of most operators and adds significant overhead with respect to configuration management. Conventional solutions which direct subscribers to a particular network while roaming involve the spoofing of network reject messages by the HPLMN operator when the user equipment makes connection attempts to VPLMNs in the PPLMN list in highest to lowest priority. The network reject messages are sent through each selected VPLMN until the desired VPLMN, as identified by the HPLMN operator, is reached. Although this technique directs user equipment to specific VPLMNs desired by the HPLMN operator, as apparent it involves a wasteful use of network resources each time such selection is needed.

To solve the deficiencies of the prior art, methods and apparatus for automatically selecting a wireless communication network by user equipment using a "steered" PLMN are utilized. A "steered PLMN" is a network to which the home network operator may direct any user equipment for communications when roaming or otherwise. Although the term "steered" network" or PLMN is utilized herein, any suitable alternative terminology may be utilized (e.g. "directed" network or PLMN).

Figure 4:
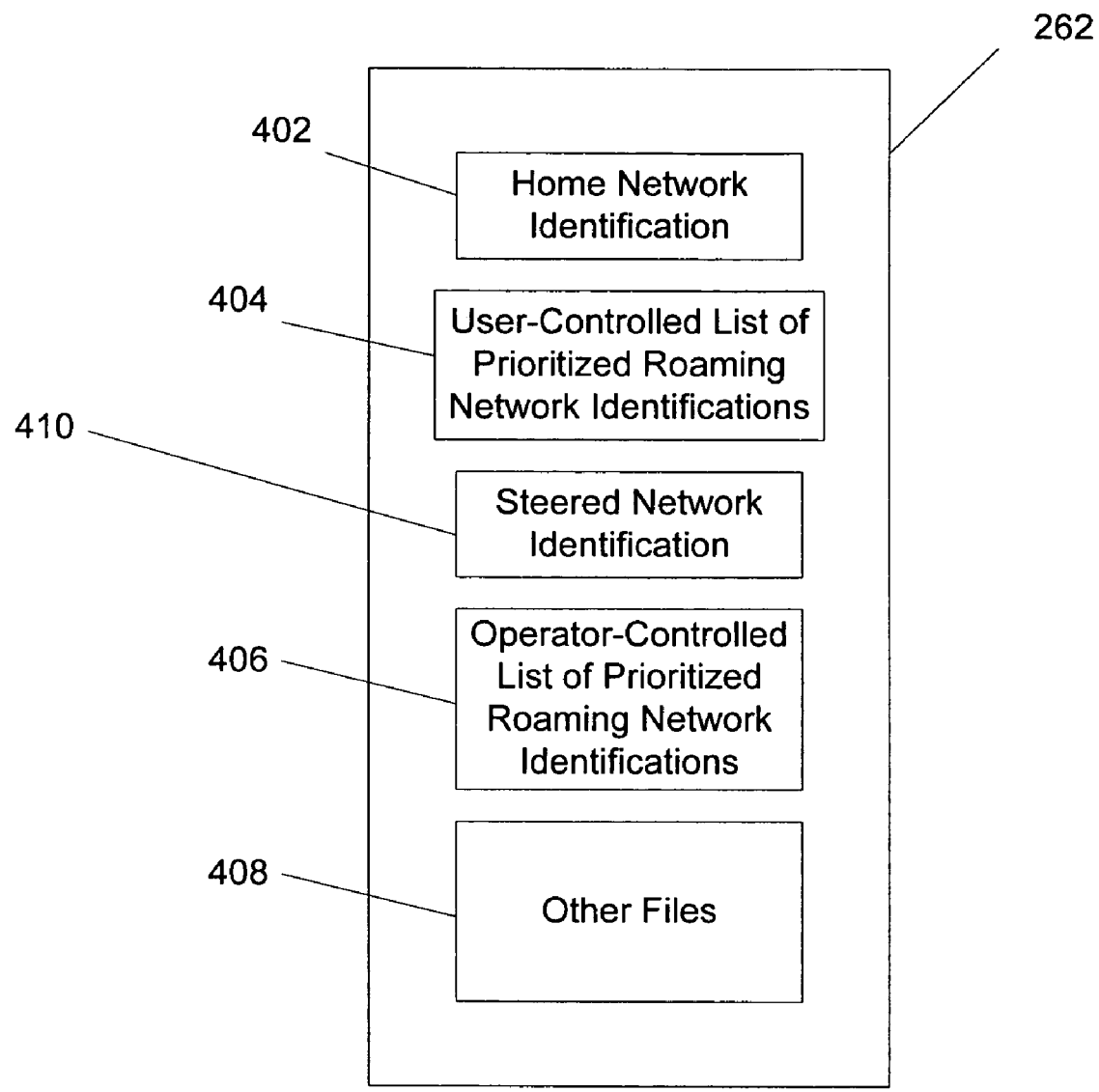
FIG. 4 is an illustration of network identifications stored in a Subscriber Identity Module (SIM) or Universal Subscriber Identity Module (USIM) of the user equipment, which includes a steered network identification associated with a steered network for a current region (e.g. a roaming region) of operation of the user equipment.

FIG. 4 is an illustration of network identifications which may be stored in SIM 262 of mobile station 202 of FIG. 2 in accordance with the present application. SIM 262 includes a home network identification 402 (or HPLMN) which is initially derived from an IMSI on SIM 262; a data file which stores a user-controlled list of prioritized roaming network identifications 404 (or "user-controlled PPLMN list"), a data file which stores an operator-controlled list of prioritized roaming network identifications (or "operator-controlled PPLMN list") 406, as well as other data files 408.

SIM 262 of FIG. 4 also includes a data file which stores a steered network identification 410 associated with a steered communication network for a current region (e.g. a roaming region) of operation. Steered network identification 410 may be or include, for example, a mobile network code (MNC) and mobile country code (MCC) pair which uniquely correspond to the steered communication network. When roaming, and/or when otherwise indicated to the mobile station, the mobile station attempts to select an available wireless communication network with use of steered network identification 410 in lieu of (or prior to) attempting to select an available wireless communication network with use of the operator-controlled list of prioritized roaming network identifications 406 (or "operator-controlled PPLMN list"). By setting the steered network identification via an over-the-air programming procedure when necessary (e.g. on a per region basis), a home network operator may "steer" user equipment to any desired network immediately and efficiently.

Figure 5:
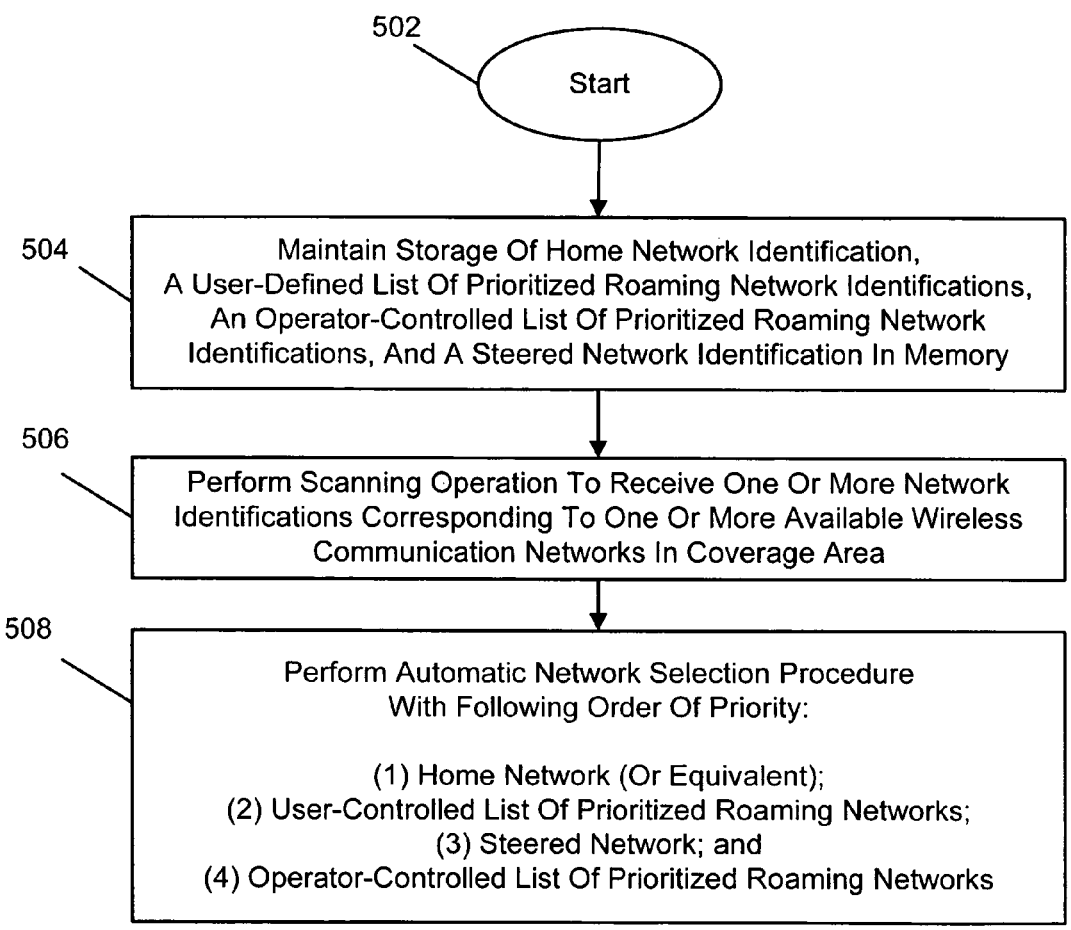
FIG. 5 is a flowchart for describing a user equipment method for an automatic network selection procedure utilizing the steered network identification.

FIG. 5 is a flowchart for describing a user equipment method of an automatic network selection procedure which utilizes SIM 262 of FIG. 4 as described above. The user equipment method may be embodied as a computer program product which includes a computer readable medium and computer program instructions stored in the computer readable medium which are executable by one or more processors of the user equipment. As described earlier in relation to FIGS. 1-2 and 4, the user equipment includes mobile equipment and the removable memory module which stores the home network identification, the list of prioritized roaming network identifications, and the steered network identification. The mobile equipment has a wireless transceiver; one or more processors coupled to the wireless transceiver; and a removable memory module interface coupled to the one or more processors which execute the method.

Beginning at a start block 502 of FIG. 5, the user equipment maintains storage of at least a home network identification, a list of prioritized roaming network identifications, and a steered network identification, in memory (step 504 of FIG. 5). These network identifications are stored in the SIM, and may also be copied from the SIM or USIM and stored in other memory (e.g. volatile memory or RAM) of the user equipment. The user equipment performs a scanning operation to receive one or more network identifications (PLMN identifications such as MNC/MCC pairs) corresponding to one or more available wireless communication networks in a coverage area of the user equipment (step 506 of FIG. 5). After the scanning operation, the user equipment performs automatic network selection procedure (step 508 of FIG. 5) with the following order of priority: (1) Home Network (HPLMN) (Or Equivalent); (2) User-Controlled List Of Prioritized Roaming Networks (User-Controlled PPLMN List); (3) Steered Network (SPLMN); and (4) Operator-Controlled List Of Prioritized Roaming Networks (Operator-Controlled PPLMN List). Section 4.4.3.1.1 of the current 3GPP standard (3GPP TS 23.122 V7.3.0 (2005-09) may be modified to reflect this new prioritization scheme of step 508.

Thus, when the user equipment is roaming in a roaming region, the user equipment attempts to select a wireless communication network with use of the steered network identification if available. This is done in lieu of (or prior to) attempting to select a wireless communication network with use of the operator-controlled list of prioritized roaming networks. When doing this, the user equipment compares the one or more received network identifications (i.e. one or more MNC/MCC pairs) from the scanning operation with the steered network identification (i.e. a steered MNC/MCC pair). If a match between a received network identification and the steered network identification is identified from the act of comparing, the user equipment may select and register with a wireless communication network corresponding to the received network identification that matches the steered network identification.

In the case where the network corresponding to the steered network identification is selected, the user equipment shall not attempt to select networks from the PPLMN list in priority over this network.

It is possible that the steered network may be unavailable, or the user equipment may be unsuccessful in its attempt to connect with the steered network. In this case, after attempting to select a wireless communication network with use of the steered network identification unsuccessfully, the user equipment may attempt to select a wireless communication network with use of the list of prioritized roaming network identifications (i.e. the operator-controlled list). The user equipment may do this by comparing the one or more received network identifications and network identifications from the list of prioritized roaming network identifications. If a match between one of the one or more received network identifications and a network identification from the list of prioritized roaming network identifications is identified from the act of comparing, the user equipment may select and register with a wireless communication network corresponding to the received network identification that matches the network identification from the list of prioritized roaming network identifications.

As indicated above, networks in the user-controlled list of prioritized roaming networks have priority over the steered network. Thus, when user-controlled networks are designated, the user equipment attempts to select a wireless communication network with use of the user-controlled list of prioritized network identifications prior to attempting to select a wireless communication network with use of the steered network identification. The user equipment does this by comparing the one or more received network identifications and network identifications from the user-controlled list of prioritized network identifications. If a match between one of the one or more received network identifications and a network identification from the user-controlled list is identified from the act of comparing, the user equipment selects and registers with a wireless communication network corresponding to the received network identification that matches the network identification from the user-controlled list of prioritized network identifications.

The steered network identification may be deemed unavailable to the user equipment if the data file or appropriate steered network identification fields are cleared (e.g. set to bit zeros or ones), or if an indication (e.g. a bit indicator) stored in the user equipment is set appropriately, for example. If it is indicated that the steered network identification is unavailable, then the user equipment will operate as conventional without the steered network identification. The user equipment may cause the steered network identification to be set as unavailable when it is no longer viable, especially when it enters a new roaming region or country. For example, the user equipment may receive a county code from the scanning operation that identifies a current country different from that of the last served network. The user equipment operates to clear the steered network identification from memory (or sets the bit indicators appropriately) based on receiving the country code that differs from the current country code. In this case, the user equipment may need a new updated steered network identification for the new region.

Again, the home network operator may "steer" user equipment to any desired network immediately and efficiently by programming the steered network identification in the user equipment via an over-the-air programming procedure (e.g. on a per region basis). The user equipment may receive the steered network identification (i.e. the SPLMN) in a message and store the steered network identification in the memory.

Figure 6:
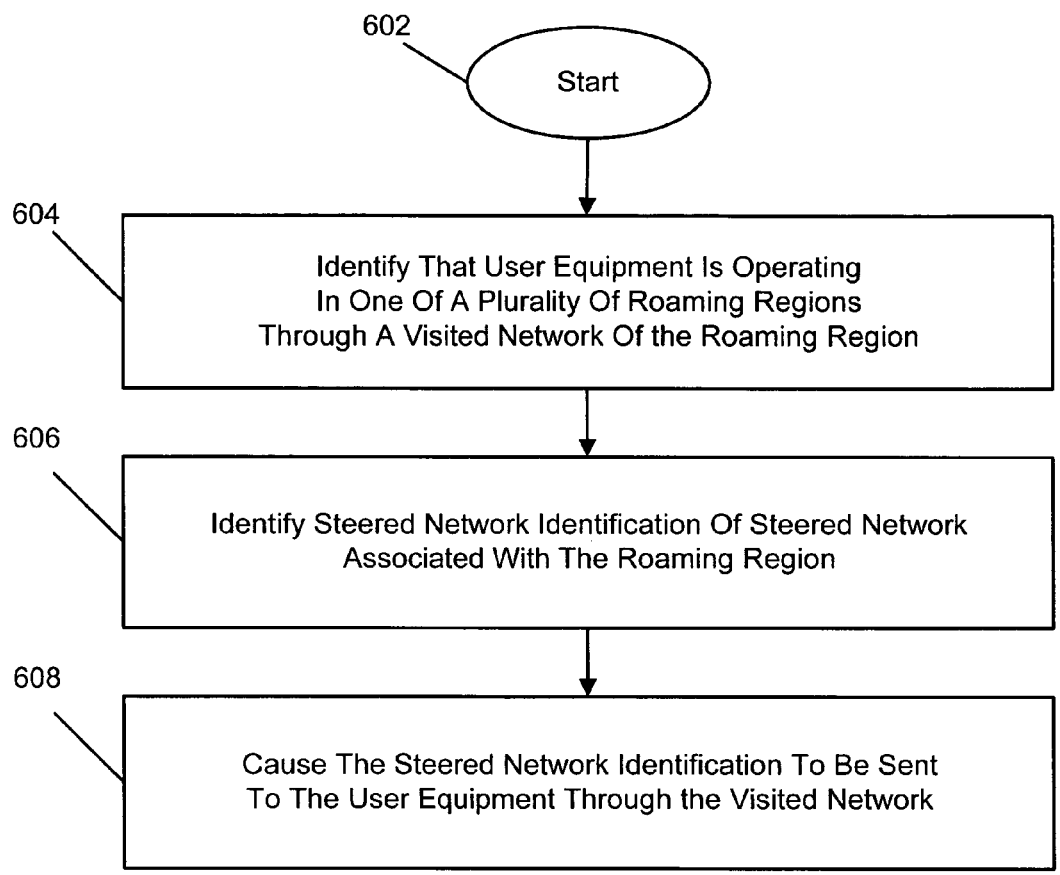
FIG. 6 is a flowchart for describing a network equipment method for steering user equipment to the steered network using the steered network identification.

FIG. 6 is a flowchart for describing a network equipment method for steering user equipment to the steered network using the steered network identification. The network equipment method may be embodied as a computer program product which includes a computer readable medium and computer program instructions stored in the computer readable medium which are executable by one or more processors of the network equipment. The network equipment may have a database which is accessible to it, which stores a plurality of different steered network identifications respectively associated with a plurality of different roaming regions. The network equipment utilized in the method of FIG. 6 is of a wireless communication network which is a home communication network of the user equipment.

Beginning at a start block 602 of FIG. 6, the user equipment has just entered into a roaming region or new country different from the country of the home communication network. In this situation, the user equipment is connected to and communicating through a visited wireless communication network or VPLMN of the roaming region. Note that this VPLMN is likely to be the highest priority, first available VPLMN designated in the operator-controlled VPLMN list of the user equipment. The network equipment of the home communication network then identifies that the user equipment is operating in one region of a plurality of roaming regions (step 604 of FIG. 6). The network equipment may identify this situation since there may be a need for the VPLMN to authenticate with the home network before full communication service is made available to the user equipment in the roaming region. In response to identifying the appropriate region of the user equipment, the network equipment identifies or selects the appropriate steered network identification or SPLMN which is uniquely associated with the roaming region (step 606 of FIG. 6). This may be performed by querying the database based on the roaming region (e.g. country code or MCC) to thereby retrieve the network code (e.g. SPLMN/VPLMN identification).

Next, the network equipment causes a message containing the SPLMN, identification corresponding to a steered wireless communication network of the roaming region to be sent through the VPLMN for programming the SPLMN identification in the user equipment (step 608 of FIG. 6). In response to receiving the message having the SPLMN identification, the user equipment programs the SPLMN identification in the appropriate SPLMN field (e.g. of the SIM or USIM). This is done so that the SPLMN will thereafter immediately be selected by the automatic network selection procedure of the user equipment. That is, when the automatic network selection procedure is performed by the user equipment, the user equipment will attempt to select a wireless communication network with use of the SPLMN in lieu of (or prior to) attempting to select a wireless communication network with use of the list of prioritized roaming network identifications, per the method of FIG. 5.

In step 608 of FIG. 6, the SPLMN identification may be sent to the user equipment through any suitable message. Preferably, the SPLMN identification is sent to the user equipment via a short message service (SMS) message in an over-the-air update download or programming procedure. Since the SMS message may merely include the MNC/MCC pair associated with the SPLMN, it is a low overhead type message. As an alternative, an Unstructured Supplementary Service Data (USSD) may be utilized as a bearer for the SPLMN identification. As another alternative, the SPLMN identification may be embedded into pre-existing or new Mobile Application Part (MAP) messages.

Other additional features and techniques may be utilized in the method. For example, a "validity timer" may be associated with the SPLMN or SPLMN field. This SPLMN validity timer may be programmed by the home network operator, and may be the time during which the SPLMN will be utilized by the user equipment. Using this feature, the user equipment uses the SPLMN for the validity time period and then utilize a different network thereafter. Additionally or alternatively, a "selection timer" or "selection time" may be associated with the SPLMN or SPLMN field. The selection timer may indicate that the SPLMN must be selected after a certain expiration of time;

the selection time may indicate that the SPLMN must be selected at a certain time or date. Other indicators are possible as well, such an indication that the SPLMN must be selected immediately, or after the next time the background scan is due. All of these indicators may be programmed by the home network operator in addition to the SPLMN identification.

Note further that, in the method described in relation to FIG. 6, the region within which the user equipment operates need not be a roaming region. The home network operator may need to temporarily steer the user equipment operating in its home network region to a different non-home network due to other reasons, for example, due to a fault condition. In this case, the steered network identification has priority over the home network identification. This alternative prioritization may be indicated in the user equipment by a separately stored indication (e.g. a bit indication) which may be set or programmed through the home network operator when necessary. The user equipment will communicate through the SPLMN in its home region until the home network operator causes the SPLMN identification to be reset or reprogrammed.

In an alternative arrangement, the user equipment may be provisioned with information (such as an internet URL or other) that will enable it to retrieve the steered network identification without the home communication network having to send the information. This SPLMN identification may be retrieved from a web site, database, or other information store provided by the home communications network or, in certain circumstances, by a third party.

The user equipment need not be steered to the SPLMN if there are reasons why it might not need or be advantageous to. For example, the user equipment may identify that GPRS is unavailable with the SPLMN and therefore may select a GPRS-capable network instead. With use of this feature, after the SPLMN is programmed in the user equipment, the user equipment may respond to the home network operator with an indication that the user equipment has ignored the request to select the SPLMN. The message may further include indicators for a plurality of reasons why the user equipment has ignored the request.

Thus, the home network operator can easily dynamically control which networks their subscribers connect to when roaming either in the home country or abroad. For example, the home network operator may direct its subscribers roaming in country A to be served by network X, by programming user equipment with the SPLMN identification corresponding to network X when the user equipment enters the country A. This may be done for each different country. At certain times it may be beneficial for an operator to use the SPLMN identification to ensure that all of their roaming subscribers be directed to one specific network. Also, a temporary network fault may mean that one network in a given country is unable to offer all of its services to its roaming subscribers. Therefore, the home network operator may use the SPLMN identification to temporarily direct its roaming subscribers towards other networks in the country which can offer a full range of service. By way of example, it is not uncommon today for GPRS to be temporarily unavailable in a certain VPLMN; in this situation, the home network operator will temporarily direct its subscribers to a VPLMN having available GPRS.

Regarding network load sharing, the home network operator may decide that it wants 40% of its roaming subscribers in a country on network X, 35% on network Y, and 25% on network Z. If network load sharing is needed using conventional techniques, the home network operator would have to maintain PPLMN lists on a per subscriber basis. Maintaining such PPLMN lists adds significant overhead with respect to configuration management. According to the present application, the home network operator needs not maintain different operator-controlled PPLMN lists for its subscribers, but rather maintain a simple database listing of each network X, Y, and Z associated with a count of current subscribers, for example, while programming different user equipment with different SPLMNs corresponding to network X, Y, and Z.

With use of an SPLMN, the home network operator does not have to update the entire PPLMN list for each subscriber using the OTA programming mechanisim, which would require a large number of SMS messages. Only a small overhead message using the OTA programming mechanism, or other signaling technique, needs to be utilized. Other conventional solutions which involve the spoofing of network reject messages is not necessary, as it involves a wasteful use of network resources each time such selection is needed. The programming of SPLMN identification involves and immediate and efficient directing of user equipment to the proper SPLMN.

Final Comments. Methods and apparatus for automatically selecting a wireless communication network by user equipment using a "steered" PLMN are described. A home network identification, a list of prioritized roaming network identifications, and a steered network identification are stored in memory (e.g. a removable memory module such as a SIM or USIM) of the user equipment. In an automatic network selection procedure, a scanning operation is performed to receive one or more network identifications corresponding to one or more available wireless communication networks in a coverage area of the user equipment. The user equipment attempts to select a wireless communication network in the coverage area by comparing the received network identifications from the scanning operation with the steered network identification. If a match between a received network identification and the steered network identification is identified, a wireless communication network corresponding to the received network identification that matches the steered network identification is selected and registered with by the user equipment. This procedure is performed in lieu of (or prior to) use of the list of prioritized roaming network identifications. The above-described user equipment technique may be embodied as a computer program product which includes a computer readable medium and computer program instructions stored in the computer readable medium which are executable by one or more processors of the user equipment. The user equipment includes mobile equipment and the removable memory module which stores the home network identification, the list of prioritized roaming network identifications, and the steered network identification. The mobile equipment has a wireless transceiver; one or more processors coupled to the wireless transceiver; a removable memory module interface coupled to the one or more processors which execute the method.

By setting the steered network identification via an over-the-air programming procedure when necessary (e.g. on a per region basis), a home network operator may "steer" user equipment to any desired network immediately and efficiently. One illustrative technique for use in steering user equipment to a steered wireless communication network by network equipment of a wireless communication network which is a home communication network of the user equipment includes the acts of identifying that the user equipment is operating in one region of a plurality of roaming regions through a visited wireless communication network of the roaming region; and causing a steered network identification corresponding to a steered wireless communication network of the roaming region to be sent through the visited wireless communication network to the user equipment, so that the steered wireless communication network is selected in an automatic network selection procedure of the user equipment. The steered network identification may be sent in a message, such as a Short Message Service (SMS) message, of an over-the-air programming procedure. The above-described network equipment technique may be embodied as a computer program product which includes a computer readable medium and computer program instructions stored in the computer readable medium which are executable by one or more processors of the network equipment.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method of selecting a wireless communication network by user equipment having a wireless transceiver, the method comprising the acts of:
    maintaining access to memory which stores a home network identification, a user-controlled list of prioritized roaming network identifications, and an operator-controlled list of prioritized roaming network identifications;
    receiving, in an over-the-air programming procedure via the wireless transceiver, from a home communication network of the user equipment, a steered network identification in a message and storing the steered network identification in the memory for use in lieu of at least one network identification in the operator-controlled list, the over-the-air programming procedure being performed without receiving and causing an update to the entire operator-controlled list of prioritized roaming network identifications;
    in an automatic network selection procedure employed by the user equipment when roaming, attempting to prioritize selection and operate with a wireless communication network corresponding to the steered network identification for user communications by:
    performing a scanning operation with the wireless transceiver to receive one or more network identifications corresponding to one or more available wireless communication networks in a coverage area of the user equipment;
    comparing the one or more received network identifications from the scanning operation with the steered network identification;
    when a match between a received network identification and the steered network identification is identified from the act of comparing, selecting and registering with a wireless communication network corresponding to the received network identification that matches the steered network identification;
    when the attempt to select the wireless communication network corresponding to the steered network identification is unsuccessful, attempting to select a wireless communication network with use of the next highest priority network identifications from the operator-controlled list by:
    comparing the one or more received network identifications and the next highest priority network identifications from the operator-controlled list; and
    when a match between one of the one or more received network identifications and one of the network identifications from the operator-controlled list is identified from the act of comparing, selecting and registering with a wireless communication network corresponding to the received network identification that matches the network identification from the operator-controlled list.

2. The method of claim 1, wherein the act of receiving the steered network identification comprises the further act of:
    receiving the steered network identification in a message comprising a Short Message Service (SMS) message.

3. The method of claim 1, wherein the operator-controlled list comprises an operator-controlled Preferred Public Land Mobile Network (PPLMN) list.

4. The method of claim 1, further comprising the acts of:
    in the automatic network selection procedure employed by the user equipment, prior to attempting to select a wireless communication network with use of the steered network identification, attempting to select a wireless communication network with use of the user-controlled list by:
    comparing the one or more received network identifications and network identifications from the user-controlled list; and
    if a match between one of the one or more received network identifications and a network identification from the user-controlled list is identified from the act of comparing, selecting and registering with a wireless communication network corresponding to the received network identification that matches the network identification from the user-controlled list.

5. The method, of claim 1, wherein upon receiving the steered network identification, immediately attempting to select the wireless communication network corresponding to the steered network identification.

6. The method of claim 1, wherein the home network identification, the operator-controlled and user-controlled lists, and the steered network identification are stored in a Subscriber Identity Module or Universal Subscriber Identity Module of the user equipment.

7. The method of claim 1, further comprising:
    if a bit indication stored in the user equipment indicates that the steered network identification is unavailable, performing the automatic network selection procedure without use of any steered network identification.

8. The method of claim 1, further comprising:
    receiving a county code from the scanning operation that differs from a current country code; and
    clearing the steered network identification from memory based on receiving the country code that differs from the current country code.

9. Mobile equipment, comprising: a wireless transceiver;
    one or more processors coupled to the wireless transceiver;
    a removable memory module interface coupled to the one or more processors and configured to receive a removable memory module which stores a home network identification, a user-controlled list of prioritized roaming network identifications, and an operator-controlled list of prioritized roaming network identifications;
    the one or more processors being configured to receive, in an over-the-air programming procedure via the wireless transceiver, from a home communication network of the mobile equipment, a steered network identification which is stored in memory for use in lieu of at least one network identification in the operator-controlled list, the over-the-air programming procedure being performed without receiving and causing an update to the entire operator-controlled list of prioritized roaming network identifications;
    the one or more processors being further configured to perform an automatic network selection procedure when roaming by attempting to prioritize selection and operate with a wireless communication network corresponding to the steered network identification for user communications by:

performing a scanning operation to receive one or more network identifications corresponding to one or more available wireless communication networks in a coverage area of the user equipment;

comparing the one or more received network identifications from the scanning operation with the steered network identification;

when a match between a received network identification and the steered network identification is identified from the act of comparing, selecting and registering with a wireless communication network corresponding to the received network identification that matches the steered network identification;

when the attempt to select the wireless communication network corresponding to the steered network identification is unsuccessful, attempting to select a wireless communication network with use of the next highest priority network identifications from the operator-controlled list by:

comparing the one or more received network identifications and the next highest priority network identifications from the operator-controlled list; and when a match between one of the one or more received network identifications and one of the network identifications from the operator-controlled list is identified from the act of comparing, selecting and registering with a wireless communication network corresponding to the received network identification that matches the network identification from the operator-controlled list.

10. The mobile equipment of claim 9, wherein each network identification corresponds to a Public Land Mobile Network "PLMN", the user-controlled list is a user-controlled Preferred PLMN "PPLMN" list, and the operator-controlled list is an operator-controlled PPLMN list.

11. The mobile equipment of claim 9, wherein the one or more processors are configured to receive the steered network identification by receiving the steered network identification in a message comprising a Short Message Service (SMS) message.

12. The mobile equipment of claim 9, further comprising:
the one or more processors being further configured to perform the automatic network selection procedure when roaming by attempting to select a wireless communication network with use of the user-controlled list, prior to attempting to select a wireless communication network with use of the steered network identification, by:

comparing the one or more received network identifications and network identifications from the user-controlled list; and if a match between one of the one or more received network identifications and a network identification from the user-controlled list is identified from the act of comparing, selecting and registering with a wireless communication network corresponding to the received network identification that matches the network identification from the user-controlled list.

13. The mobile equipment of claim 9, wherein the one or more processors are further configured to immediately attempt to select the wireless communication network corresponding to the steered network identification upon receiving the steered network identification.

14. The mobile equipment of claim 9, wherein the removable memory module comprises a Subscriber Identity Module or Universal Subscriber Identity Module.

15. The mobile equipment of claim 9, wherein the one or more processors are further configured to:
perform the automatic network selection procedure without use of any steered network identification if a bit indication stored in the user equipment indicates that the steered network identification is unavailable.

16. The mobile equipment of claim 9, the one or more processors being further configured to perform the automatic network selection procedure by:
receiving a county code from the scanning operation that differs from a current country code; and
clearing the steered network identification based on receiving the country code that differs from the current country code.

* * * * *

UNITED STATES PATENT AND TRADEMARK OFFICE
CERTIFICATE OF CORRECTION

| | | |
|---|---|---|
| PATENT NO. | : 8,027,677 B2 | Page 1 of 1 |
| APPLICATION NO. | : 11/352809 | |
| DATED | : September 27, 2011 | |
| INVENTOR(S) | : Paul Marcus Carpenter | |

It is certified that error appears in the above-identified patent and that said Letters Patent is hereby corrected as shown below:

IN THE SPECIFICATION:

Col. 5, line 13, "Ul 116" should read -- UI 116 --.

Col. 6, line 3, "For all mobile station's" should read -- For all mobile stations --.

Col. 7, line 23, "and like" should read -- and the like --.

Col. 9, line 38, "which is source" should read -- which is the source --.

Col. 9, line 48, "establish wireless tunnel" should read -- establish a wireless tunnel --.

Col. 13, line 33, "a county code" should read -- a country code --.

Col. 16, lines 10-11, "involves and immediate" should read -- involves an immediate --.

IN THE CLAIMS:

Claim 16, col. 20, line 35, "a county code" should read -- a country code --.

Signed and Sealed this
Twentieth Day of December, 2011

David J. Kappos
*Director of the United States Patent and Trademark Office*